United States Patent [19]

Hermansen

[11] Patent Number: 5,335,543
[45] Date of Patent: Aug. 9, 1994

[54] DIVER'S PIVOTAL GAUGE BOOT

[75] Inventor: Frank Hermansen, Newport Beach, Calif.

[73] Assignee: U.S. Divers Co., Inc., Santa Ana, Calif.

[21] Appl. No.: 33,165

[22] Filed: Mar. 16, 1993

[51] Int. Cl.⁵ ............... G01D 11/24; G01L 19/14
[52] U.S. Cl. .......................... 73/431; 73/756; 73/291; 73/714
[58] Field of Search .............. 73/290 R, 291, 431, 73/756, 178 R, 714

[56] References Cited

U.S. PATENT DOCUMENTS 4,197,747  4/1980  Koehler ..................... 73/431
4,466,283  8/1984  Osterhout ................. 73/431 X

OTHER PUBLICATIONS

Dacor Corporation 1992 Catalog Pages (Three Pages).

*Primary Examiner*—Richard E. Chilcot, Jr.
*Assistant Examiner*—Joseph L. Felber
*Attorney, Agent, or Firm*—George F. Bethel; Patience K. Bethel

[57] ABSTRACT

The disclosure sets forth a diver's gauge boot having a first portion for receipt of a depth gauge and second portion for receiving a tank pressure gauge therein, with a sleeve for connecting the tank pressure gauge into a high pressure hose adapted for connection to a tank for indicating pressure in the tank, and a rotational connector between the first portion and the second portion with a pocket in the second portion for receiving a second instrument on a side of said second portion disposed away from said tank pressure gauge.

20 Claims, 2 Drawing Sheets

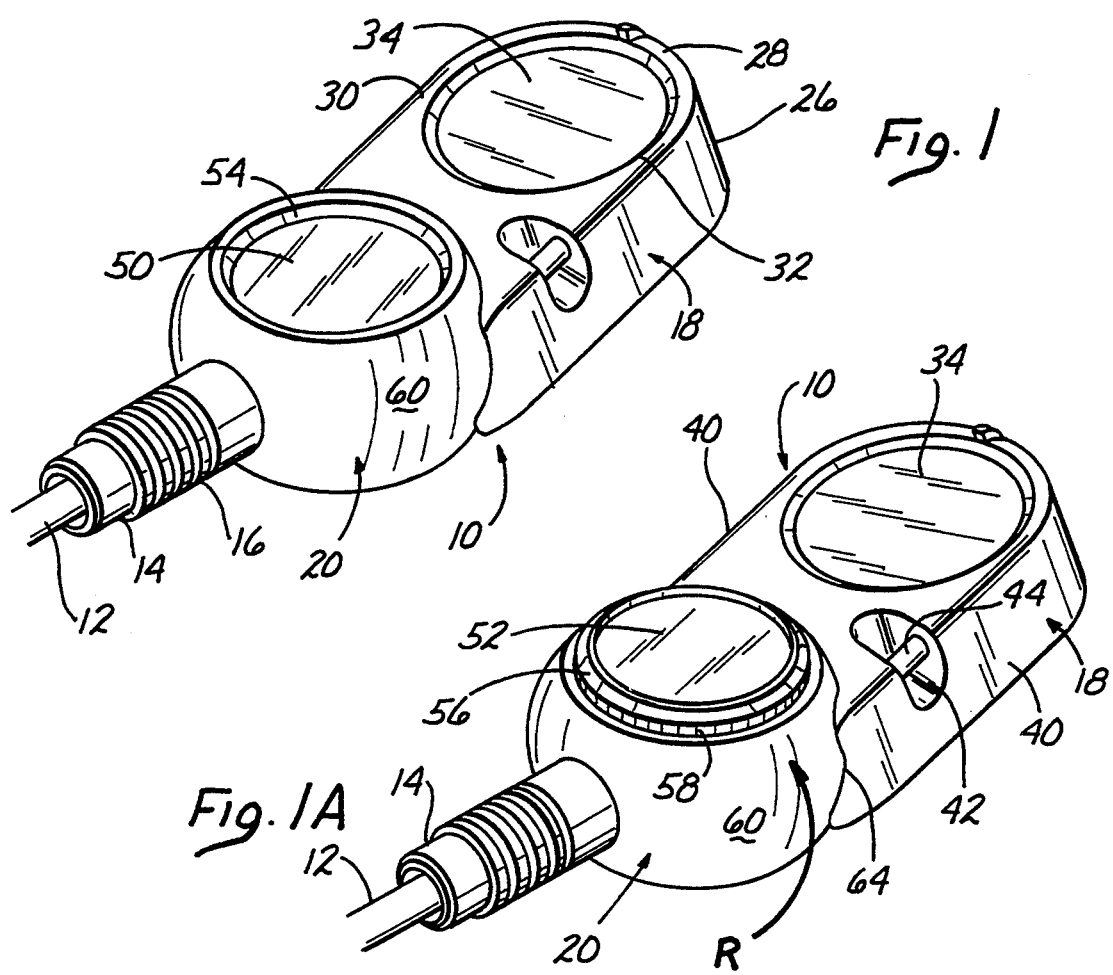
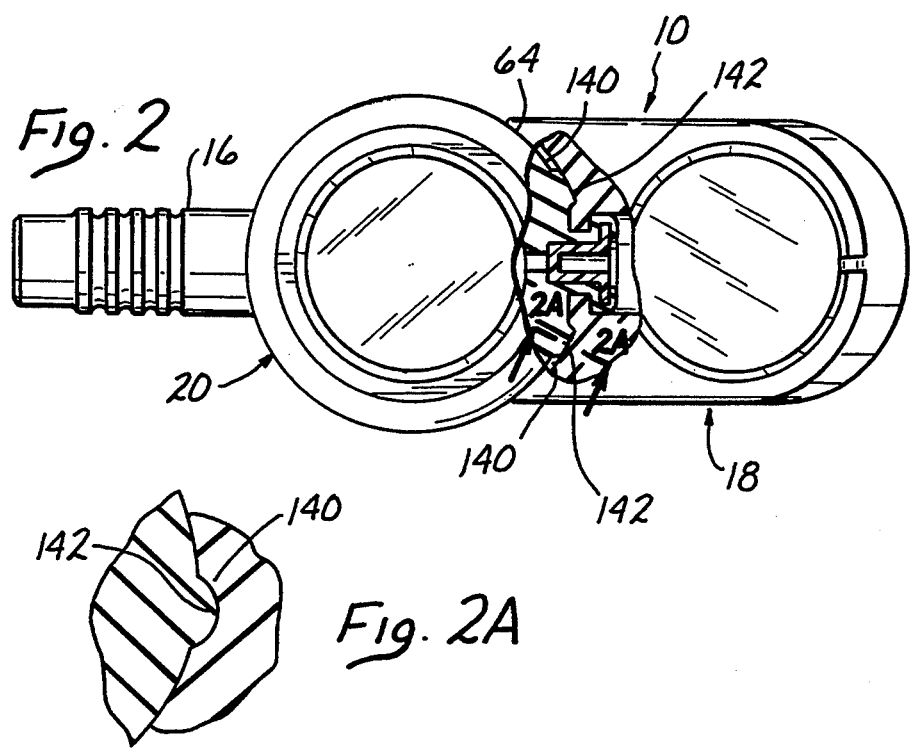

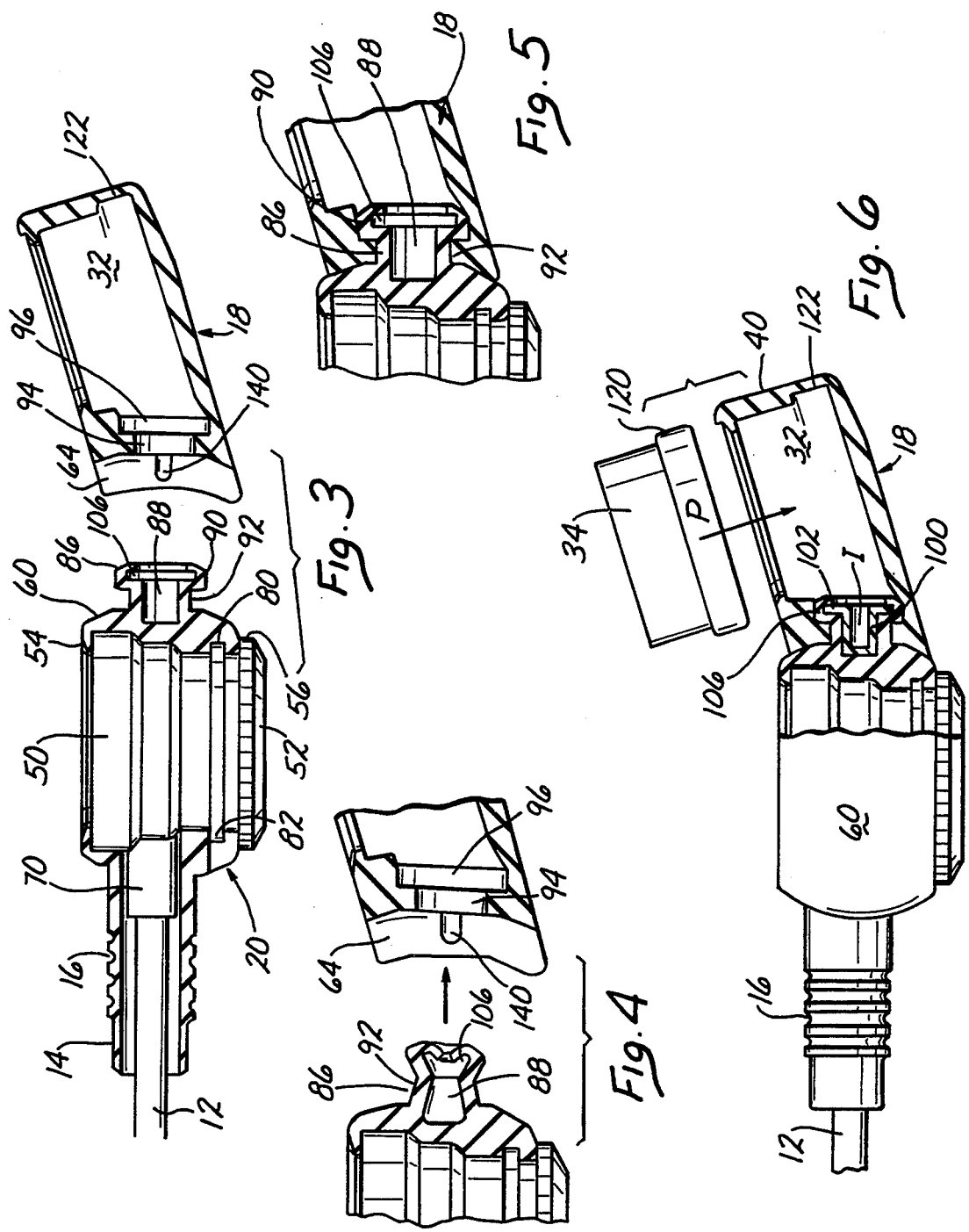

DIVER'S PIVOTAL GAUGE BOOT

FIELD OF THE INVENTION

The field of this invention is within the diver's gauge art. More particularly, it pertains to instruments and gauges that are maintained in a single grouping or array to provide for multiple instrument and gauge readings. The gauges and instruments can be in the form of a breathing gas tank pressure gauge, a depth gauge, a timer, and a compass.

PRIOR ART AND SOLUTIONS

Diver's gauges and instruments enclosed in boots are used by divers for among other things to determine depth. Such depth gauges can be in the form of an analog gauge having a bourdon tube meter which responds to various depths. Other gauges can also provide depth readings in the form of digital electronic readouts that correspond to depth based upon a transducer sensing a particular depth.

Other gauges include gauges connected to a diver's breathing gas tank. Such gauges including bourdon tube gauges determine the tank pressure so that the diver can determine how much breathing gas is left in the tank. These pressure gauges for reading tank pressure can also be based upon a transducer sensing tank pressure and providing an electronic readout.

It is also customary for divers to utilize a compass for determining bearing and location when undertaking a dive, as well as watches and timers.

The foregoing gauges, instruments and components have been combined as a single unit providing the foregoing readings and information. The units are oftentimes referred to as dive consoles or boots in which to hold the respective gauges, components, instruments, and compass.

Such gauge boots are generally connected to a tank of breathing gas by means of a hose. The hose is generally in the form of a high pressure hose which is connected directly to the pressure of the tank. The high pressure hose at the other end is in turn connected to a tank pressure gauge. The gauge indicates the amount or pressure of the gas and corresponds to the gas remaining in the tank.

Since diving requirements are such wherein tank pressure must be read, the utilization of a high pressure hose connected to the tank pressure gauge is usually a requisite of any dive gauge boot containing a plurality of gauges. As a consequence, the boot is usually such wherein it is tethered or connected to the tank by means of the high pressure hose.

A second gauge in the form of a depth gauge is also utilized. The depth gauge indicates to the diver the degree of depth the diver has descended to. The information is quite critical to the diver. The depth gauge is also often seated in the gauge boot in conjunction with the tank pressure gauge. Additionally, other gauges and instruments are utilized such as timers, watches, compasses, and instruments for the diver to determine the relative status of a dive.

In many cases the two respective depth and tank pressure gauges are usually placed in a boot in association with a compass.

It is a general rule that the depth gauge is highly important and generally read by a diver constantly due to the fact that the diver needs to know his depth. This stems from not only the standpoint of safety, but also to provide for decompression from a particular depth or series of depths to which a diver has dove. The information as to tank pressure and the compass bearing is not as often reviewed by a diver as in the case of the depth reading. Consequently, the orientation of the depth gauge in conjunction with the tank pressure and compass bearing can be alternately changed so long as the depth gauge reading is available to the diver.

In times past, divers have ganged side by side the respective gauges and compass together in a series of three (3).

In order to avoid ganging the respective instruments together in the form of a compass and gauges, this invention allows one of the gauges or compass to be rotated with respect to the other. This provides a reading that can be made of the compass or the tank pressure gauge depending on the desire of the diver while still maintaining a reading of the depth gauge. This makes for a more compact gauge boot.

Additionally, the invention hereof provides for a canted or angularly oriented depth gauge for ease and facility of reading by the diver.

Taken as a whole, the invention solves the problem of ganging multiple gauges, thereby providing for small compact and readily accessible and easily read gauges and instruments within a dive gauge boot.

SUMMARY OF THE INVENTION

In summation, this invention comprises a diver's gauge boot having a depth gauge, a compass, and a tank pressure gauge or other instruments which can be mounted on opposite sides and rotated with respect to each other for purposes of viewing.

More particularly, the invention comprises a depth gauge portion which is rotatably connected to a second portion for relative movement with respect thereto. The second portion can be directly connected to a tank of breathing gas. When connected to a tank of breathing gas, the pressure therein can be sensed and read by a tank pressure gauge. This serves to accommodate the requirements of the diver when reading the depth as well as the pressure.

Mounted on the opposite side from the tank pressure gauge is a compass. The compass and the tank pressure gauge can be rotated relative to the depth gauge so that one or the other can be read in conjunction with the depth gauge.

The foregoing enhances the ability to provide for a compact diver's gauge boot wherein the depth can constantly be read while at the same time the tank pressure and compass bearings can be alternately provided depending upon a diver's choice.

BRIEF DESCRIPTION OF THE DRAWINGS

FIG. 1 shows perspective view of the diver's gauge boot of this invention.

FIG. 1A shows the diver's gauge boot of FIG. 1 with the instrument opposite from that shown in FIG. 1 rotated into a viewing position.

FIG. 2 shows a plan view of the diver's gauge boot with a fragmented sectional view of the interconnected portions of the gauge boot at its rotatable joindure.

FIG. 2A shows a sectional view of the detent and indexing means seen along lines 2A—2A of FIG. 2.

FIG. 3 shows a mid-line sectional view as sectioned through FIG. 1, with the two respective portions of the gauge boot separated.

FIG. 4 shows a fragmented sectional view of the interconnecting portions as they are being emplaced and joined.

FIG. 5 shows a fragmented sectional view of the interconnection after the two portions have been connected.

FIG. 6 shows a partial sectional view with the depth gauge being emplaced within the boot after connection of the respective portions of the boot.

DESCRIPTION OF THE PREFERRED EMBODIMENTS

Looking at FIGS. 1 and 2 the gauge boot, cover, or console 10 for the gauges can be seen. The boot 10 for the gauges can be made of an elastomeric material such as a rubberized plastic, a resilient elastomer, or of numerous suitable plastics. In this particular case, it is made from a rubberized plastic to provide for flexibility, ease of assembly, as well as overall longevity when used in the oceanic environment.

The boot 10 is tethered by or connected to a tank of high pressure breathing gas by means of a high pressure hose 12. The hose 12 is fitted into a hose connection sleeve 14 which comprises a ribbed outer portion 16 that has been ribbed to allow flexibility of movement of the hose with respect to the gauge boot 10.

The sleeve 14 is formed as a portion of the gauge boot 10 to allow for flexibility while providing a protective sleeve around the high pressure hose 12.

The gauge boot 10 comprises two portions. The first portion is an angularly oriented or canted depth gauge or rotatable portion 18. The second portion is a combination tank pressure gauge portion and compass portion 20. The tank pressure gauge and compass portion 20 can be rotated in relative relationship to the depth gauge portion 18. The relative rotation can be with the depth gauge portion 18 turning around its axis in relationship to the tank gauge pressure and compass portion 20. It becomes a matter of relative relationship as to which turns with respect to the other. Suffice it to say, portions 18 and 20 can turn with respect to each other to allow for an angular depth gauge portion to be read with respect to tank pressure or in the alternative compass bearings.

The depth gauge portion 18 is formed of a rubberized material in a configuration that will be detailed with respect to sectional FIGS. 3 through 6 as to their orientation and fit. The outside walls of the depth gauge portion are formed generally at intersecting right angles and terminate in a semi-circular wall portion 26. Wall portion 26 has a rounded arcuate portion 28 which forms a lip or flange 30 surrounding a pocket 32. The pocket 32 receives a depth gauge 34.

Within the side walls which can be defined as rubberized side wall sections 40, a slot 42 is formed. The slot 42 has a pin 44. The pin 44 spans the slot 42 and is molded into the rubberized walls 40 of the depth gauge portion 18. The pin 44 can receive a lanyard or other suitable tethering means, such as an eyelet, hook, or other means to hold the gauge boot 10 in relationship to the outer wear of a diver such as a belt, or attachment or fastening assemblies of a diver.

Looking more particularly at FIG. 1A, it can be seen that the dive tank pressure gauge and compass portion 20 has been rotated with respect to the depth gauge portion 18. This is shown with regard to arrow R which shows the rotation of the tank pressure gauge portion 20 with respect to the depth gauge portion 18.

The tank pressure gauge or second portion 20 with the compass can be relatively rotated in any manner with respect to the depth gauge portion 18. The depth gauge portion 18 rotates around its axis with respect thereto or in the alternative the tank pressure gauge or second portion 20 rotates with respect to the depth gauge portion 18. The tank pressure gauge portion 20 encompasses a tank pressure gauge 50 on one side and a compass 52 on the other side. The tank pressure gauge portion 20 has a rim or flange 54 under which the tank pressure gauge 50 is seated. This rim 54 is a round circular rim and encompasses the tank pressure gauge 50 therein.

A compass 52 on the other side of the tank pressure gauge 50 has a bezel 56 having a knurled portion 58. The knurled portion allows the compass bezel 56 to be rotated for placing the bezel into various bearing orientations with regard to the compass 52 needle.

The second portion or tank pressure gauge portion and compass portion 20 is formed with a rounded circular wall 60. The rounded circular wall 60 has a curvilinear or convex outer surface which accommodates an interior or concave curve 64 of the depth gauge portion 18. This interiorly curved concave portion 64 allows the tank pressure gauge rounded wall 60 to rotate in a ball and socket manner. The second portion 20 can be somewhat described as a ball configuration with opposite flat truncated faces. In effect, the concave rounded wall portion 64 serves as a socket for the outer wall convex portion 60 so that a ball and socket function for rotational movement is effectuated between respective portions 20 and 18.

It should be noted that when the depth gauge or first portion 18 turns with respect to the tank pressure gauge portion 20, a 180° turn provides for an angular or canted orientation of the face of the depth gauge portion with respect to the face of the tank pressure gauge 50 or compass 52. Thus, a tilted angular or canted orientation of the depth gauge or first portion 18 is provided for the ease and facility of viewing purposes. Fundamentally, the ball and socket arrangement of the convex wall 60 and interior socket curved or concave wall 64 of the respective portions 20 and 18 allow for an angular orientation of the depth gauge portion 18 so that it is always tilted toward whatever instrument (i.e. the compass 52, or the tank gauge 50) for viewing purposes.

Looking more particularly at FIGS. 2 through 6, it can be seen how the connection between portions 18 and 20 is effectuated. Turning to FIG. 3, it can be seen that the sleeve 14 having ribs 16 surrounds the high pressure hose 12. The high pressure hose 12 is connected by a high pressure fitting 70 which seats into the movement a bourdon tube or other mechanical or electrical transducer such as of the tank pressure gauge 50. The tank pressure gauge 50 can be a standard bourdon tube tank pressure gauge. It can also be of any other type such as a digital meter, digital readout without a meter, or other means to provide a reading of the tank pressure by the tank pressure gauge or pressure reading instrument 50. The tank pressure gauge 50 is seated in the second portion 20 as can be seen in FIG. 3 under the rounded circular lip 54. It is held in position by the elastomeric characteristics of the rubber forming the boot holding it in tightened juxtaposition.

The compass 52 with its bezel 56 is seated into a pocket opposite from that of the tank pressure gauge 50. This is accomplished by emplacing the compass 52 into tightened juxtaposition with a flange thereof seated within a groove 80 of the boot gauge portion 20. The flange of the compass 52 can be seen as an external flange 82 that is circumferentially oriented around the compass 52.

In order to couple the rounded second portion 20 by virtue of the walls 64 of the portion 18 seating against the walls 60 of the second portion 20, a T shaped extension 86 is utilized. The T shaped extension 86 is of a relatively flexible rubber material. The extension 86 has an opening or cavity 88 therein. The opening or cavity 88 is such wherein it allows for a collapsing of the T shaped extension 86.

The T shaped extension 86 comprises an outer flange or transverse portion of the T 90 and an undercut or groove forming an upright of the T 92 which surrounds the opening or cavity 88. This undercut or groove 92 allows for a seating of the T shaped member or extension 86 within an opening formed as a stepped groove configuration having an interior bore 94 and a stepped groove or ledge 96. These two openings, bore 94 and stepped groove or ledge 96 are T shaped in section to receive the T shaped extension 86 therein.

The receipt is accomplished as shown in FIG. 4 by collapsing the T shaped extension 86 and sliding it into the bore 94 and behind the ledge of the groove 96. After they have slid together as can be seen in FIG. 5, the extension 86 expands outwardly and fills the bore 94 and the groove or ledge 96 with the respective upright and transverse elements of the elastomeric T shaped extension 86.

Looking now at FIG. 6, it can be seen that a plastic U shaped member or grommet 100 having an outer circular flange 102 has been emplaced within the interior cavity 88 of the T shaped extension member 86. The U shaped member or grommet 100 seats into the interior cavity 88 of the T shaped extension 86 while the outer flange 102 seats into an interior groove 106 of the T shaped member 86. Groove 106 has been shown in FIG. 5 and is the interior groove of the T shaped extension having been shown in FIG. 3.

The U shaped member 100 can be any stiffening means such as a plastic or metal grommet, a spring loaded locking spring, or other means which can be emplaced in the direction of arrow I of FIG. 6 into the interior groove 106. Also any other means to expand the T shaped member 86 outwardly so that it backs and is locked up against the walls or ridge of groove or ledge 96 is sufficient.

It should be understood that the coupling means can be by any member such as the extension or T shaped member 86 which is journaled within an opening to which it can be seated and retained for rotational movement. Such an extension as T shaped member 86 when retained and journaled within the retention area such as the stepped bore 94 and groove or ledge 96 provide the function of the rotational aspects of the depth gauge portion 18 turning in relative relationship to the tank gauge and compass portion 20.

In order to emplace the depth gauge 34 into the depth gauge portion 18, it is merely slid into the expandable elastomeric walls 40 of the depth gauge pocket or cavity 32. After being slid into the expanding walls 40, it is secured by means of an outer flange 120 of the depth gauge 34 being seated within a groove or undercut 122 of the first portion 18. The flange 120 when seated in the direction of arrow P serves to hold the locking or retention grommet, U shaped member, or securement means 100 into the relationship it enjoys within the groove 106 and interior cavity 88 of the T shaped extension 86.

Within the concave wall 64, are two grooves or slots 140. The grooves or slots 140 can be seen in FIG. 3 as well as FIGS. 2 and 2A in the detail of FIG. 2. The grooves or slots 140 are such wherein they can receive a detent or protuberance 142.

The grooves 140 are emplaced on either side of the bore 94 within the wall 64 approximately 180° apart. The grooves 140 and detents 142 are roughly in a midline along the concave wall 64. They are placed in a manner so that they can provide detent locking of the depth gauge portion 18 from rotation with respect to the tank pressure gauge and compass portion 20. When the depth gauge portion 18 has been rotated, the depth gauge 34 due to the grooves 140 and the detent 142 alignment, causes the respective faces of the depth gauge 34 and respective tank pressure gauge 50 or compass 52 to be in upward facing appearance with respect to each other so that they are not rotationally disoriented.

Fundamentally, the detent and groove locking arrangement of the detents 142 and grooves 140 allow for an orientation after the respective first and second portions 18 and 20 are rotated with respect to each other to be in a proper viewing position. In effect, the tank pressure gauge 50 when placed in viewing orientation with the depth gauge 34 is held by the orientation of the detents 142 locking and snapping into the grooves 140 and holding it in that position until the portions 18 and 20 are later turned with respect to each other.

The depth gauge portion 18 and tank pressure and compass portion 20 can be rotationally oriented along their axes. The respective gauge faces are then offset from each other rather than being in an aligned axial relationship. However, it is thought that the respective locking in the aligned facial relationship by the grooves 140 locking into the detents 142 is the generally accepted gauge reading mode. In effect, the gauges in the first and second portions 18 and 20 can be turned on their axes with respect to each other so that they are not in an exact facial alignment but rotationally offset.

The net result of the foregoing structure is to allow for the ability of a gauge boot having a gauge or instrument on either side thereof to be rotated with respect to another portion so that the other portion having a gauge or instrument therein can be read with respect to either gauge in the first portion. In effect, either portion can be rotated through the ball and socket aligned relationship to provide for a gauge reading with respect to one or the other of another portion. The depth gauge or first portion 18 can be provided with another pocket, cavity, or means for holding a second instrument to provide for a double gauge or instrument orientation first portion 18.

The gauge boot of this invention as can be seen incorporates the concept of a pivotal or rotationally oriented gauge boot that is divided into two sectors or portions. The two respective sectors or portions can be turned with respect to each other whereby one portion incorporates a plurality of instruments that can be turned with respect to another portion which incorporates a single or plural number of instruments that can be read with respect to one of the other instruments.

The rotational orientation is enhanced by a fixed locking means to orient the gauges into whatever position is necessary. The gauges or instruments can also be oriented to various angles by having multiple detents and grooves oriented at different radial angles from the axis of rotation such as grooves 140 and detents 142. The gauges can be differently oriented as to being part of a grouping where they are back to back in one particular portion of the gauge boot such as portions 18 or 20. They can also be oriented on the sides thereof so that they can turn and be viewed with respect to a side view or angular view with respect to the other gauges to which the gauges of one portion can be read with respect to the other.

As a consequence hereof, this invention should be read to incorporate the concept of multiple gauges being mounted on opposite sides of one portion that can be turned with respect to another gauge portion. Also, from the narrowest point of view, the invention can be read as to a depth gauge that is rotationally oriented with regard to gauges or instruments such as a compass and a tank pressure gauge mounted on opposite sides so that one or the other can be read with respect to a depth gauge by virtue of each instrument being opposite from each other on the other side of one rotational portion of the gauge boot.

I claim:

1. A diver's gauge boot comprising:
   a first portion of said gauge boot for receipt of a depth gauge;
   a second portion of said gauge boot having means for receiving a first instrument comprising a tank pressure gauge therein;
   means for connecting the tank pressure gauge in said second portion to a high pressure hose adapted for connection to a tank for indicating pressure in the tank by said tank pressure gauge;
   means for rotationally connecting said first portion to said second portion; and,
   means within said second portion for receiving a second instrument on a side of said second portion disposed away from said tank pressure gauge so that said depth gauge in said first portion can be rotationally moved by said rotational connection means to be read in relationship to said first or second instrument.

2. The gauge boot as claimed in claim 1 wherein: said boot is formed of an elastomeric material.

3. The gauge boot as claimed in claim 1 comprising: said means for rotationally connecting said first portion to said second portion of the gauge boot formed as an extension extending from one of said first or second portions to the other portion and seating therein.

4. The gauge boot as claimed in claim 3 wherein said rotational connection means comprises:
   an extension from said second portion;
   a groove behind an undercut in said first portion for receiving the extension from said second portion; and,
   means for locking said extension of said second portion within said first portion.

5. The gauge boot as claimed in claim 4 further comprising:
   detent means on one of said portions for engaging a at least one groove on the other portion to index rotation beyond a given point of one portion with respect to the other portion.

6. The gauge boot as claimed in claim 5 wherein:
   said member extends from said second portion and is formed as a T shaped member having a cavity therein;
   said first portion has a bore and a groove for receiving said T shaped member within said first portion; and,
   grommet means for extending into the cavity of said T shaped member for holding it within the groove of said first portion.

7. The gauge boot as claimed in claim 6 wherein:
   said first portion is adapted to receive a depth gauge; and,
   said second portion is adapted to receive a pressure gauge for reading tank pressure and on the opposite side thereof means for receiving a compass so that said tank pressure gauge or said compass can be rotationally oriented with regard to said depth gauge to read said tank pressure gauge and said depth gauge or in the alternative said depth gauge and said compass.

8. The gauge boot as claimed in claim 7 further comprising:
   a slot within a wall of said gauge boot having an opening therein and a pin extending across said opening for receipt of a lanyard thereby.

9. The combination of a depth gauge and a tank pressure gauge for a diver within a gauge boot comprising:
   a first portion of said gauge boot having a depth gauge therein;
   a second portion of said gauge boot having a first instrument comprising a tank pressure gauge therein with a connection means adapted for connection to a tank of breathing gas, and having a second instrument on the opposite side from said tank pressure gauge; and,
   means for rotationally mounting said second portion to said first portion so that said depth gauge can be turned to be read in combination with said tank pressure gauge or the second instrument.

10. The combination as claimed in claim 9 wherein: said gauge boot is formed of an elastomeric material.

11. The combination as claimed in claim 10 further comprising:
    detent means for indexing the first portion to the second portion.

12. The combination as claimed in claim 11 wherein:
    said detent means comprises a slot on said first portion and a detent extending from said second portion; and,
    wherein contact between said first and second portions comprises a rounded walled curvilinear portion for receipt within a partial arcuate wall.

13. The combination as claimed in claim 12 wherein:
    said depth gauge is mounted within said first portion so as to tilt said depth gauge toward the second portion of said gauge boot.

14. The combination as claimed in claim 9 wherein:
    said second instrument in said second portion is a compass.

15. The combination as claimed in claim 14 further comprising:
    rotational connection means formed as a T shaped extension from one of said portions of said gauge boot; and,
    means for receiving said T shaped extension in the other portion of said gauge boot.

16. The combination as claimed in claim 15 wherein:
    said extension comprises a T shaped member having a cavity therein with a groove; and,
    the portion for receiving said T shaped extension comprises a bore and a stepped groove for receiving the transverse portion of said T shaped member and having a grommet for expanding the groove of said T shaped member into said stepped groove.

17. A gauge boot for receipt of a depth gauge and a tank pressure gauge comprising:
a first portion of said gauge boot which receives the depth gauge therein;
a second portion of said gauge boot which receives the tank pressure gauge therein;
means within said second portion of said gauge boot for receiving an instrument mounted on the opposite side from said tank pressure gauge;
connection means between said first portion and said second portion providing a rotational connection between said first portion and said second portion so that said first portion can be rotated for reading said depth gauge with respect to either said tank pressure gauge or said instrument.

18. The gauge boot as claimed in claim 17 wherein:
said second portion instrument receipt area is adapted for receiving a compass; and,
wherein said rotational connection comprise a T shaped extension having a cavity extending from said second portion to said first portion, said first portion having a bore for receipt of said T shaped extension and a ledge behind said bore on which the transverse portion of the T shaped extension can be engaged; and,
grommet means for expanding the cavity of said T shaped extension into the ledge area of said first portion.

19. The gauge boot as claimed in claim 18 further comprising:
a wall within said first portion configured as a segment of a socket;
a wall portion on said second portion configured as a portion of a rounded ball type element to fit within the socket of said first portion;
a groove within said first portion socket wall; and,
detent means on the mounted portion of said ball of said second portion for receipt within said groove so that said first portion can be relatively turned in rotational movement with respect to said second portion and provided with an indexing means by said detent means engaging the groove.

20. The gauge boot as claimed in claim 19 wherein:
said first portion is canted toward said second portion so that a depth gauge when mounted in said first portion is tilted for viewing purposes with respect to the tank pressure gauge of said second portion or compass.

* * * * *